United States Patent

[11] 3,595,171

| [72] | Inventor | Francis Ernest Sheppard |
| | | Oadby, England |
| [21] | Appl. No. | 845,795 |
| [22] | Filed | July 29, 1969 |
| [45] | Patented | July 27, 1971 |
| [73] | Assignee | Rolls-Royce Limited |
| | | Derby, England |
| [32] | Priority | Aug. 8, 1968 |
| [33] | | Great Britain |
| [31] | | 37933/68 |

[54] TRACTION UNIT FOR AN AIR CUSHION VEHICLE
5 Claims, 2 Drawing Figs.

| [52] | U.S. Cl. | 104/23 FS, 104/23 R, 104/134 |
| [51] | Int. Cl. | B61b 13/08 |
| [50] | Field of Search | 104/23, 23 FS, 134 |

[56] References Cited
UNITED STATES PATENTS

| 3,055,312 | 9/1962 | Jay | 104/23 FS |
| 3,060,867 | 10/1962 | Holmquist | 104/23 FS |
| 3,164,103 | 1/1965 | Lathers | 104/23 FS |
| 3,168,875 | 2/1965 | Reed | 104/23 FS |

*Primary Examiner*—Arthur L. La Point
*Assistant Examiner*—D. W. Keen
*Attorney*—Cushman, Darby & Cushman ABSTRACT: The invention concerns a traction unit for an air cushion vehicle which is adapted to be driven over a T-shaped rail or rails, the traction unit comprising at least one driving wheel which is rotatable about an horizontal axis and which is adapted for driving engagement with the underside of the head of a respective rail, a motor for driving the or each driving wheel, and air cushion means which, in operation, maintain the traction unit in a desired position with respect to the rail or rails such that the or each driving wheel is urged upwardly against the respective rail.

PATENTED JUL 27 1971
3,595,171
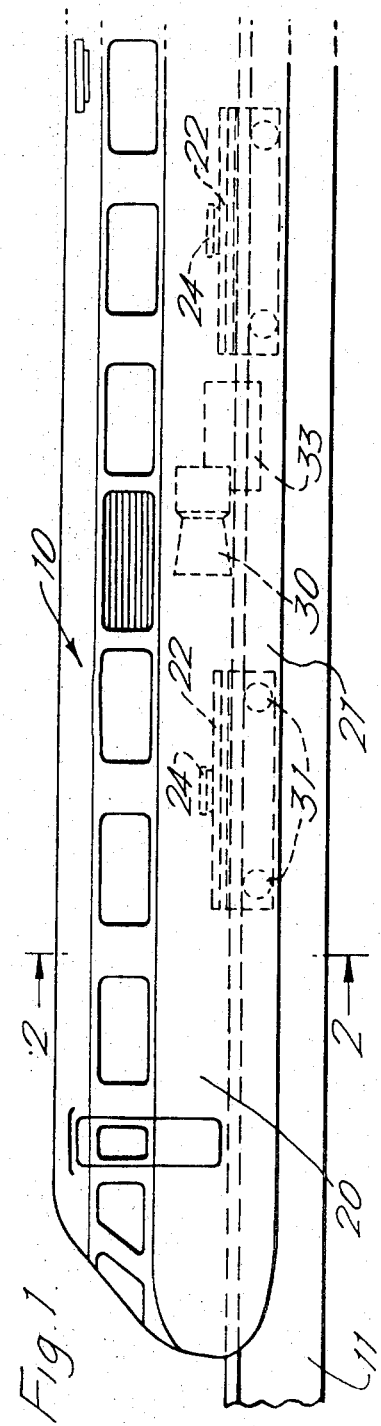
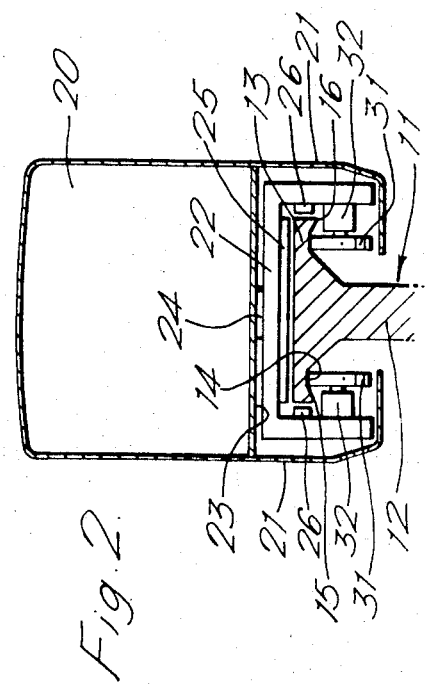
INVENTOR
FRANCIS ERNEST SHEPPARD
BY
Cushman, Darby & Cushman
ATTORNEYS

TRACTION UNIT FOR AN AIR CUSHION VEHICLE

This invention concerns a traction unit for an air cushion vehicle which is adapted to be driven over a T-shaped rail or rails.

According to the present invention, there is provided a traction unit for an air cushion vehicle which is adapted to be driven over a T-shaped rail or rails, the traction unit comprising at least one driving wheel which is rotatable about an horizontal axis and which is adapted for driving engagement with the underside of the head of a respective rail, a motor for driving the or each driving wheel, and air cushion means which, in operation, maintain the traction unit in a desired position with respect to the rail or rails such that the or each driving wheel is urged upwardly against the respective rail.

As will be appreciated by reason of the disposition of the driving wheel or wheels beneath the rail or rails, the driving or wheels drivingly engage a part of the rail or rails which is protected to a substantial extent from water and ice.

Preferably the or each driving wheel is provided with a pneumatic tire which, in operation, is urged upwardly against the respective rail with a substantially constant pressure. The provision of such a substantially constant pressure and the fact that the pneumatic tire does not engage a part of the rail which is exposed to water and ice, makes it possible to employ a pneumatic tire at a speed, e.g. of 200 m.p.h., at which the air cushion vehicle may be propelled.

Resilient means may, if desired, also be provided for urging the or each driving wheel upwardly against the respective rail.

The or each motor is preferably an electric motor.

The traction unit may be provided with at least one pair of aligned driving wheels adapted to be disposed on opposite sides of the rail or rails.

The or each driving wheel may be mounted on a bogie which is provided with means for flexibly connecting it to the body of the air cushion vehicle. Moreover, the air cushion means may be provided on the bogie and may comprise at least one lift pad adapted to be disposed adjacent to the top of the respective rail, and guide pads adapted respectively to be disposed on opposite sides of and adjacent to the rail, means being provided for supplying compressed air to each said pad.

The invention also comprises an air cushion vehicle provided with at least one traction unit as set forth above, the bogie being flexibly connected to the body of the vehicle.

Thus, the or each bogie may be flexibly connected to the body of the vehicle by means of at least one hollow rubber spring. Moreover, the or each bogie may be connected to the body of the vehicle by tie bar structure which permits relative pivotal movement between the respective bogie and the body of the vehicle.

The vehicle may be provided with a gas turbine engine which is arranged to supply compressed air to the air cushion means.

The invention is illustrated merely by way of example, in the accompanying diagrammatic drawings, in which:

FIG. 1 is a broken away side view of an air cushion vehicle provided with traction units in accordance with the present invention, and FIG. 2 is a section taken on the line 2–2 of FIG. 1.

In FIG. 1 there is shown an air cushion vehicle 10 which is adapted to be driven, e.g. at speeds of up to 200 m.p.h., over a T-shaped monorail 11. As clearly shown in FIG. 2, the monorail 11 has a vertically extending web portion 12, and a head portion 13 whose underside 14 is provided with downwardly extending flanges 15, 16 on opposite sides thereof.

The vehicle 10 (which may for example be adapted to carry 100 to 150 passengers) has a body 20 which is provided with skirts 21 disposed on opposite sides of the monorail 11. The body 20 is also provided with two bogies 22.

Each of the bogies 22 is flexibly connected to the underside 23 of the body 20 by means of hollow, rubber, air filled springs 24, the springs 24 constituting, in effect, a universal joint between each bogie 22 and the body 20 so as to permit any relative pivotal movement therebetween. Moreover, each of the bogies 22 may be connected to the body 20 by a tie bar structure (not shown) which is such as to permit relative lateral movement to occur between the bogie 22 and the body 20 that will help to stabilize the bogies 20 and thus to ensure that the latter remain relatively stationary during acceleration.

Each of the bogies 22 is provided with one or more lift pads 25 which, in operation, are disposed adjacent (e.g. one-half inch from) the top of the monorail 11, and with at least one pair of guide pads 26 which, in operation, are respectively disposed on opposite sides of and adjacent to (e.g. one-half inch from) the monorail 11. The pads 25, 26 are supplied with compressed air from a gas turbine engine 30. Thus, the pads 25, 26 provide, in operation, air cushions which maintain the respective bogie 22 in a desired spaced position with respect to a monorail 11.

The flexible connection between the bogies 22 and the body 20 will allow the vehicle 10 to follow sharper bends in the monorail 11 than it could otherwise negotiate, and it will also allow the vehicle 10 to negotiate more successfully imperfections in the monorail 11, e.g. uneven surfaces.

Each of the bogies 22 is provided with two pair of aligned driving wheels 31 which are disposed on opposite sides of the monorail 11 and which are urged against the underside 14 by metal or rubber springs (not shown). Each of the driving wheels 31 is rotatable about an horizontal axis and is provided with a pneumatic tire (not shown), which is in driving engagement with the underside 14 of the head portion 13 of the monorail 11. Each of the driving wheels 31 is driven by an electric motor 32 which is supplied with current from an alternator 33 driven by the gas turbine engine 30. Alternatively, the current for the electric motors 32 may be picked up (by means not shown) from the monorail 11.

In operation, the air supplied by the gas turbine engine 30 to the lift pad 25 is such that the respective bogie 22 and hence the vehicle 10 is maintained in a predetermined position with respect to the monorail 11 such that each of the pneumatic tires on the driving wheels 31 is urged upwardly against the underside 14 with a substantially constant predetermined pressure. For example, there may be a load of 500 pounds on each of the driving wheels 31. Moreover, the provision of the said metal or rubber springs which urge the driving wheels 31 against the monorail 11 compensates for the variations in air cushion lift which are due to imperfections in the monorail 11.

Since the tires will be urged against the underside 14 with a substantially constant pressure, and since the underside 14 will be protected from rain and snow, it is possible to provide the driving wheels 31 with pneumatic tires which will be satisfactory for use with an air cushion vehicle travelling at 200 m.p.h.

If desired, the driving wheels 31 may be driven by motors other than electric motors. For example, they may be driven by a shaft drive direct from the gas turbine engine 30, or from another gas turbine engine.

I claim:

1. In combination: a T-shaped rail having a vertically extending web portion with a head portion thereon, said head portion having at least one horizontal downwardly facing surface on its underside adjacent said web portion, and means for protecting said at least one horizontal downwardly facing surface from water and ice collecting on the same; and an air cushion vehicle mounted on said T-shaped rail for movement thereon, said air cushion vehicle having a traction unit comprising a bogie, at least one driving wheel carried by said bogie and rotatable about a horizontal axis, said driving wheel having driving engagement with said downwardly facing surface on said head portion, a motor for driving said driving wheel, and air cushion means which, in operation, maintain said traction unit in a desired position with respect to said T-shaped rail such that the driving wheel is urged upwardly against the downwardly facing surface of said head portion.

2. The combination as claimed in claim 1, in which said protection means includes a short downwardly extending flange along an edge of said head portion and spaced from said web by said downwardly facing surface.

3. The combination as claimed in claim 2, in which said driving wheel is provided with a pneumatic tire which, in operation, is urged upwardly against the downwardly facing surface of said head with a substantially constant pressure.

4. The combination as claimed in claim 3, in which said traction unit is provided with at least one pair of aligned driving wheels disposed on opposite sides of said web of said T-shaped rail and in which said head portion has two horizontal downwardly facing surfaces on its underside and on opposite sides of said web, said pair of driving wheels respectively engaging said two downwardly facing surfaces.

5. The combination as claimed in claim 4, in which said air cushion vehicle includes a gas turbine engine, said gas turbine engine supplying compressed air directly to said air cushion means.